(12) United States Patent
Zhang et al.

(10) Patent No.: US 12,151,575 B2
(45) Date of Patent: Nov. 26, 2024

(54) VISUAL POSITIONING METHOD AND SYSTEM FOR BATTERY REPLACEMENT DEVICE

(71) Applicants: AULTON NEW ENERGY AUTOMOTIVE TECHNOLOGY GROUP, Guangdong (CN); SHANGHAI DIANBA NEW ENERGY TECHNOLOGY CO., LTD., Shanghai (CN)

(72) Inventors: Jianping Zhang, Shanghai (CN); Wencheng Lu, Shanghai (CN)

(73) Assignees: AULTON NEW ENERGY AUTOMOTIVE TECHNOLOGY GROUP, Guangzhou (CN); SHANGHAI DIANBA NEW ENERGY TECHNOLOGY CO., LTD., Shanghai (CN)

( * ) Notice: Subject to any disclaimer, the term of this patent is extended or adjusted under 35 U.S.C. 154(b) by 81 days.

(21) Appl. No.: 17/790,511

(22) PCT Filed: Jan. 4, 2021

(86) PCT No.: PCT/CN2021/070180
§ 371 (c)(1),
(2) Date: Jul. 1, 2022

(87) PCT Pub. No.: WO2021/136552
PCT Pub. Date: Jul. 8, 2021

(65) Prior Publication Data
US 2023/0191933 A1    Jun. 22, 2023

(30) Foreign Application Priority Data

Jan. 2, 2020 (CN) .......................... 202010003033.7

(51) Int. Cl.
*B60L 53/37*    (2019.01)
*B60L 53/80*    (2019.01)
(Continued)

(52) U.S. Cl.
CPC ............... *B60L 53/37* (2019.02); *B60L 53/80* (2019.02); *G06T 7/0002* (2013.01); *G06T 7/70* (2017.01);
(Continued)

(58) Field of Classification Search
CPC ........ B60L 53/37; B60L 53/80; G06T 7/0002; G06T 7/70; G06T 2207/10148;
(Continued)

(56) References Cited

U.S. PATENT DOCUMENTS 11,840,156 B2 *  12/2023  Chen .................. B60K 1/04
2006/0187312 A1   8/2006  Labaziewicz et al.
(Continued)

FOREIGN PATENT DOCUMENTS

CN    105235658 A    1/2016
CN    205872015 U    1/2017
(Continued)

OTHER PUBLICATIONS

Apr. 2, 2021 International Search Report issued in International Patent Application No. PCT/CN2021/070180.
(Continued)

*Primary Examiner* — Michael Lee

(57) ABSTRACT

A visual positioning method and system for a battery replacement device. The method comprises: controlling a battery replacement device to move below a battery accommodating portion at the bottom of an electric vehicle;
(Continued)

photographing, by means of a photographing apparatus, a first target photographing region at a first focal length so as to obtain a positioning determination photograph; controlling the photographing apparatus to adjust the first focal length to a second focal length; and photographing, by means of the photographing apparatus, a second target photographing region at the second focal length so as to obtain a lock-state determination photograph. By means of the photographed photographs at different focal lengths, automatic adjustment of positioning, locking and unlocking is realized, not only achieving efficient and accurate determination of positioning, locking and unlocking of the battery replacement device, but also enabling the battery replacement device to achieve integral and efficient adjustment.

10 Claims, 4 Drawing Sheets

(51) Int. Cl.
G06T 7/00 (2017.01)
G06T 7/70 (2017.01)
H04N 23/67 (2023.01)

(52) U.S. Cl.
CPC ... *H04N 23/67* (2023.01); *G06T 2207/10148* (2013.01)

(58) Field of Classification Search
CPC .... H04N 23/67; H04N 23/675; H04N 23/676; H04N 23/60; H04N 23/65; H04N 23/90; Y02T 10/70; Y02T 10/7072; B60S 5/06
See application file for complete search history.

(56) References Cited

U.S. PATENT DOCUMENTS

| 2011/0113609 | A1* | 5/2011 | Berdelle-Hilge ... H01M 50/249 29/762 |
| 2018/0215043 | A1 | 8/2018 | Michalakis |
| 2019/0126755 | A1* | 5/2019 | Yoshida ................ B60W 10/30 |

FOREIGN PATENT DOCUMENTS

| CN | 106427514 | A | | 2/2017 |
| CN | 106740029 | A | | 5/2017 |
| CN | 106740725 | A | | 5/2017 |
| CN | 206351680 | U | | 7/2017 |
| CN | 107264486 | A | | 10/2017 |
| CN | 105946812 | B | | 12/2017 |
| CN | 107886545 | A | | 4/2018 |
| CN | 108128132 | A | | 6/2018 |
| CN | 106080159 | B | | 3/2019 |
| CN | 106979192 | B | | 3/2019 |
| CN | 109827507 | A | * | 5/2019 |
| CN | 209166347 | U | | 7/2019 |
| CN | 106926825 | B | | 10/2019 |
| CN | 210325889 | U | | 4/2020 |
| CN | 210652647 | U | | 6/2020 |
| CN | 111845437 | A | | 10/2020 |
| JP | 1990312456 | A | | 12/1990 |
| JP | 2011257770 | A | | 12/2011 |

OTHER PUBLICATIONS

Apr. 2, 2021 Written Opinion of the International Searching Authority issued in International Patent Application No. PCT/CN2021/070180.
Jul. 5, 2022 International Preliminary Report on Patentability issued in International Patent Application No. PCT/CN2021/070180.
Jul. 9, 2024 Japanese Notice of Reasons for Refusal of JP2022-541233.

* cited by examiner

VISUAL POSITIONING METHOD AND SYSTEM FOR BATTERY REPLACEMENT DEVICE

The present application is a National Stage of International Application No. PCT/CN2021/070180, filed on Jan. 4, 2021, which claims priority of the Chinese Patent Application No. CN202010003033.7, filed on Jan. 2, 2020, the contents of which are incorporated herein by reference in their entireties.

TECHNICAL FIELD

The present invention relates to the field of visual inspection, and in particular, to a visual positioning method and system for a battery replacement device.

BACKGROUND

Under the background of energy constraints and environmental pollution, China regards the development of new energy as an important measure to improve the environment and save costs. The electric vehicle industry has shown a good momentum of development in recent years with continuous efforts. For electric vehicles, there are two methods of charging and battery replacing.

In the prior art, the Chinese invention patent application publication No. CN106427514A discloses a "Locking Apparatus and Electric Vehicle", the locking apparatus includes locking shafts arranged on both sides of a battery pack, and a locking base arranged on an electric vehicle. Once the lock shafts are inserted into the lock base, the lock base will lock the lock shafts to fix the battery pack. The Chinese invention patent application publication No. CN106740725A discloses a "Battery Replacement Platform, Battery Replacement Mobile Platform, and Quick-Replacement System for Battery Replacement of Electric Vehicle", which is used for removing and mounting a battery pack in cooperation with the above locking apparatus. When the electric vehicle is parked in a fixed position, the battery replacement platform is lifted, unlocks the locking apparatus for removing a depleted battery from the electric vehicle, and then mounts a fully-charged battery to the electric vehicle. In a process of mounting a fully-charged battery in a battery replacement device (that is, the battery replacement platform), it is key to align the battery with a battery accommodating portion of the electric vehicle so that the battery can be successfully mounted. However, in the prior art, the problem of inaccurate positioning of the battery replacement device often occurs, and at this time, it needs to be adjusted manually, resulting in time consuming and low efficiency in battery replacement, and moreover, it is very easy to cause the battery to be mounted incorrectly.

CONTENT OF THE PRESENT INVENTION

A technical problem to be solved by the present invention is to provide a visual positioning method and system for a battery replacement device in order to overcome the defects of time consuming and low efficiency in positioning, locking, and unlocking of the battery replacement device in the prior art.

The present invention solves the above technical problems through the following technical solutions:

The present invention provides a visual positioning method for a battery replacement device. The battery replacement device is used for removing a depleted battery from an electric vehicle and mounting a fully-charged battery thereto. The battery replacement device is provided with a photographing apparatus. A bottom of the electric vehicle includes a battery accommodating portion.

The visual positioning method for includes:

controlling the battery replacement device to move below the battery accommodating portion at the bottom of the electric vehicle;

photographing, by means of the photographing apparatus, a first target photographing region at a first focal length so as to obtain a positioning determination photograph;

controlling the photographing apparatus to adjust the first focal length to a second focal length; and photographing, by means of the photographing apparatus, a second target photographing region at the second focal length so as to obtain a lock-state determination photograph.

The present invention controls the photographing apparatus to adjust the focal length for separately photographing the positioning determination photograph and the lock-state determination photograph at the bottom of the vehicle, so as to photograph clearer positioning determination photograph and lock-state determination photograph. The efficient and accurate automatic determination and adjustment of positioning, locking, and unlocking are further implemented by means of photographs photographed at different focal lengths, thereby greatly reducing the battery replacement time.

Preferably, after the step of photographing, by means of the photographing apparatus, a first target photographing region at a first focal length so as to obtain a positioning determination photograph, the method further includes:

a positioning determination step: determining whether a distance between a positioning determination object in the positioning determination photograph and a first boundary target of the positioning determination photograph is within a first preset range, and if not, determining that the positioning is incorrect;

after the step of photographing, by means of the photographing apparatus, a second target photographing region at the second focal length so as to obtain a lock-state determination photograph, the method further includes:

a locking determination step: determining whether a distance between a locking determination object in the lock-state determination photograph and a second boundary target of the lock-state determination photograph is within a second preset range, and if not, determining that the locking is incorrect; or an unlocking determination step: determining whether a distance between an unlocking determination object in the lock-state determination photograph and the second boundary target of the lock-state determination photograph is within a third preset range, and if not, determining that the unlocking is incorrect.

In the present invention, the accuracy of the positioning determination, locking determination, and unlocking determination is further improved through the positioning determination step, the locking determination step, and the unlocking determination step.

Preferably, the method further includes:

adjusting a position, an angle, or an inclination of the battery replacement device when it is determined that the positioning is incorrect, and re-performing the positioning determination step until it is determined that the positioning is correct.

In the present invention, the battery replacement device is adjusted in different methods until the positioning determination is correct, which reduces the adjustment time of the positioning determination and improves the positioning adjustment efficiency.

Preferably, the method further includes:

determining that the positioning fails when the number of adjustments exceeds a first preset number of times.

In the present invention, the positioning efficiency of the battery replacement device is further improved by limiting the number of times of adjustment during positioning.

Preferably, the method further includes:

adjusting the position of the battery replacement device when it is determined that the locking is incorrect, and re-performing the locking determination step until it is determined that the locking is correct.

In the present invention, by adjusting the position of the battery replacement device until the locking determination is correct, the adjustment time of the locking determination is reduced, the locking adjustment efficiency is improved, and a situation that the battery is not mounted properly is avoided.

Preferably, the method further includes:

determining that the locking fails when the number of adjustments exceeds a second preset number of times.

In the present invention, the locking efficiency of the battery replacement device is further improved by limiting the number of times of adjustment during locking.

Preferably, the method further includes:

moving the battery replacement device toward a front of the vehicle or adjusting a position of the battery replacement device when it is determined that the unlocking is incorrect, and re-performing the unlocking determination step until it is determined that the unlocking is correct.

In the present invention, by moving the position of the battery replacement device toward the front of the vehicle or adjusting the position of the battery replacement device until the unlocking determination is correct, the adjustment time of the unlocking determination is reduced, and the unlocking adjustment efficiency is improved.

Preferably, before re-performing the locking determination step or the unlocking determination step, the method further includes: re-performing the locking step or the unlocking step.

Preferably, before the step of controlling the photographing apparatus to adjust a first focal length to the second focal length, the method further includes:

controlling the battery replacement device to mount a fully-charged battery to the electric vehicle or remove a depleted battery from the electric vehicle.

Preferably, the photographing apparatus is a zoom camera;

in the step of photographing, by means of the photographing apparatus, a first target photographing region at a first focal length so as to obtain a positioning determination photograph, a focal length range of the first focal length is 330 mm to 380 mm; and in the step of photographing, by means of the photographing apparatus, a second target photographing region at the second focal length so as to obtain a lock-state determination photograph, a focal length range of the second focal length is 45 mm to 55 mm.

In the present invention, by means of setting the photographing apparatus as the zoom camera and setting the focal length ranges of the first focal length and the second focal length, the automatic adjustment of the photographing focal length before and after the positioning and the removing and mounting of the battery is achieved through the zoom camera, which further improves the photographing sharpness of the first target photographing region and second target photographing region.

Preferably, the photographing apparatus includes a first camera and a second camera;

the step of photographing, by means of the photographing apparatus, a first target photographing region at a first focal length so as to obtain a positioning determination photograph includes:

controlling the first camera to photograph the first target photographing region at the first focal length so as to obtain the positioning determination photograph;

the step of controlling the photographing apparatus to adjust the first focal length to the second focal length includes:

controlling the first camera to stop working and starting the second camera; and the step of photographing, by means of the photographing apparatus, a second target photographing region at the second focal length so as to obtain a lock-state determination photograph includes:

controlling the second camera to photograph the second target photographing region at the second focal length so as to obtain the lock-state determination photograph.

In the present invention, automatic adjustment of the photographing focal length can be achieved by setting two zoom cameras and different focal length ranges corresponding to respective zoom cameras and automatically replacing the first camera with the second camera after the battery is mounted or unlocked.

Preferably, in the step of controlling the first camera to photograph the first target photographing region at the first focal length so as to obtain the positioning determination photograph, the focal length range of the first focal length is 330 mm to 380 mm; and in the step of controlling the second camera to photograph the second target photographing region at the second focal length so as to obtain the lock-state determination photograph, the focal length range of the second focal length is 45 mm to 55 mm.

In the present invention, by setting different focal length ranges of the first focal length and the second focal length, the sharpness of the photographing of the first target photographing region and the second target photographing region is further improved, so that no matter in the positioning determination or the locking determination, clear photographing of the target photographing region can be achieved.

Preferably, the first boundary target is a boundary of the photographed positioning determination photograph, and the second boundary target is a boundary of the lock-state determination photograph.

In the present invention, by setting the boundary of the photograph as the boundary target, a clearer and easier-to-detect reference object for positioning determination, locking determination, and unlocking determination is provided. On one hand, the efficiency of positioning, locking, and unlocking of the battery replacement device is further improved, on the other hand, the time consuming of positioning, locking, and unlocking is greatly reduced.

The present invention further provides a visual positioning system for a battery replacement device. The battery replacement device is used for removing a depleted battery from an electric vehicle and mounting a fully-charged battery thereto. The battery replacement device is provided with a photographing apparatus. The bottom of the electric vehicle includes a battery accommodating portion.

The visual positioning system includes: a battery replacement device driving module, a positioning photographing module, a focal length adjusting module, and a lock-state photographing module.

The battery replacement device driving module is configured to control the battery replacement device to move below the battery accommodating portion at the bottom of the electric vehicle;

the positioning photographing module is configured to photograph, by means of the photographing apparatus, a first target photographing region at a first focal length so as to obtain a positioning determination photograph;

the focal length adjusting module is configured to control the photographing apparatus to adjust the first focal length to a second focal length; and the lock-state photographing module is configured to photograph, by means of the photographing apparatus, a second target photographing region at the second focal length so as to obtain a lock-state determination photograph.

The present invention controls, by the focal length adjusting module, the photographing apparatus to adjust the focal length for separately photographing the positioning determination photograph and the lock-state determination photograph at the bottom of the vehicle, so as to photograph clearer positioning determination photograph and lock-state determination photograph. The efficient and accurate automatic determination and adjustment of positioning, locking, and unlocking are further implemented by means of photographs photographed by the positioning photographing module and the locking photographing module at different focal lengths, thereby greatly reducing the battery replacement time.

Preferably, the system further includes a positioning determination module, a locking determination module, and an unlocking determination module.

The positioning determination module is configured to determine whether a distance between a positioning determination object in the positioning determination photograph and a first boundary target of the positioning determination photograph is within a first preset range, and if not, determine that the positioning is incorrect;

the locking determination module is configured to determine whether a distance between a locking determination object in the lock-state determination photograph and a second boundary target of the lock-state determination photograph is within a second preset range, and if not, determine that the locking is incorrect; and the unlocking determination module is configured to determine whether a distance between an unlocking determination object in the lock-state determination photograph and the second boundary target of the lock-state determination photograph is within a third preset range, and if not, determine that the unlocking is incorrect.

In the present invention, the sharpness of the positioning determination, locking determination, and unlocking determination is further improved by the positioning determination of the positioning determination module, the locking determination of the locking determination module, and the unlocking determination of the unlocking determination module.

Preferably, the positioning determination module is further configured to adjust a position, an angle, or an inclination of the battery replacement device when it is determined that the positioning is incorrect and re-determine whether a distance between a positioning determination object in the positioning determination photograph and a first boundary target of the positioning determination photograph is within a first preset range, until it is determined that the positioning is correct.

In the present invention, the battery replacement device is adjusted in different methods by the positioning determination module until the positioning determination is correct, which reduces the adjustment time of the positioning determination and improves the positioning adjustment efficiency.

Preferably, the positioning determination module is further configured to determine that the positioning fails when the number of adjustments exceeds a first preset number of times.

In the present invention, the positioning efficiency of the battery replacement device is further improved by the positioning determination module by limiting the number of times of adjustment during positioning.

Preferably, the locking determination module is further configured to adjust the position of the battery replacement device when it is determined that the locking is incorrect and re-determine whether a distance between a locking determination object in the lock-state determination photograph and a second boundary target of the lock-state determination photograph is within a second preset range, until it is determined that the locking is correct.

In the present invention, by adjusting the position of the battery replacement device by the locking determination module until the locking determination is correct, the adjustment time of the locking determination is reduced, the locking adjustment efficiency is improved, and a situation that the battery is not mounted properly is avoided.

Preferably, the locking determination module is further configured to determine that the locking fails when the number of adjustments exceeds a second preset number of times.

In the present invention, the locking efficiency of the battery replacement device is further improved by the locking determination module by limiting the number of times of adjustment during locking.

Preferably, the unlocking determination module is further configured to move the position of the battery replacement device toward a front of the vehicle or adjust the position of the battery replacement device when it is determined that the unlocking is incorrect and re-determine whether a distance between an unlocking determination object in the lock-state determination photograph and the second boundary target of the lock-state determination photograph is within a third preset range, until it is determined that the unlocking is correct.

In the present invention, by adjusting the position of the battery replacement device by the unlocking determination module until the unlocking determination is correct, the adjustment time of the unlocking determination is reduced, the unlocking efficiency is improved, and it is convenient for removing the battery from the vehicle.

Preferably, before the locking determination module or the unlocking determination module is recalled, the locking action or the unlocking action is further re-performed.

Preferably, the system further includes:

a battery removing and mounting module configured to control the battery replacement device to mount a fully-charged battery to the electric vehicle or remove a depleted battery from the electric; and the focal length adjusting module is further configured to call the battery removing and mounting module after the focal length is adjusted.

Preferably, the photographing apparatus is a zoom camera.

The focal length range of the first focal length is 330 mm to 380 mm, and the focal length range of the second focal length is 45 mm to 55 mm.

In the present invention, by setting the photographing apparatus as a zoom camera and setting the focal length ranges of the first focal length and the second focal length, the automatic adjustment of the photographing focal length before and after the positioning and the removing and mounting of the battery is achieved through the zoom camera, which further improves the photographing sharpness of the first target photographing region and second target photographing region.

Preferably, the photographing apparatus includes a first camera and a second camera;

the positioning photographing module is configured to control the first camera to photograph the first target photographing region at the first focal length so as to obtain a positioning determination photograph;

the focal length adjusting module is configured to control the first camera to stop working and start the second camera; and the locking photographing module is configured to control the second camera to photograph the second target photographing region at the second focal length so as to obtain a lock-state determination photograph.

In the present invention, automatic adjustment of the photographing focal length can be achieved by setting two zoom cameras and different focal length ranges corresponding to respective zoom cameras and automatically replacing the first camera with the second camera after the battery is mounted and unlocked.

Preferably, the focal length range of the first focal length is 330 mm to 380 mm, and the focal length range of the second focal length is 45 mm to 55 mm.

In the present invention, by setting different focal length ranges of the first focal length and the second focal length, the photographing sharpness of the first target photographing region and second target photographing region is further improved, so that no matter in the positioning determination, the locking determination, or the unlocking determination, clear photographing of the target photographing region can be achieved.

Preferably, the first boundary target is a boundary of the photographed positioning determination photograph, and the second boundary target is a boundary of the lock-state determination photograph.

In the present invention, by setting the boundary of the photograph as the boundary target, a clearer and easier-to-detect reference object for positioning determination, locking determination, and unlocking determination is provided. On one hand, the efficiency of positioning, locking, and unlocking of the battery replacement device is further improved, on the other hand, the time consuming of positioning, locking, and unlocking is greatly reduced.

The positive improvement effect of the present invention lies in that: the present invention obtains the corresponding positioning determination photograph and lock-state determination photograph by controlling the photographing apparatus to adjust the focal length and photographing the bottom of the vehicle, so that a clearer positioning determination photograph and lock-state determination photograph can be photographed, and by photographs photographed at different focal lengths, the automatic adjustment of positioning and locking or unlocking can be realized, which can not only realize efficient and accurate automatic positioning determination, locking determination, and unlocking determination of the battery replacement device, but also enable the battery replacement device to achieve integral and efficient adjustment, thereby greatly reducing the battery replacement time.

DETAILED DESCRIPTION OF THE PREFERRED EMBODIMENT

The present invention is further described below through embodiments, but the present invention is not limited to the scope of the described embodiments. The following Embodiments 1 to 6 describe a visual positioning method by taking the locking apparatus and the battery replacement device in Chinese invention patent application publication Nos. "CN106427514A" and "CN106740725A" as examples.

Embodiment 1

Figure 1:
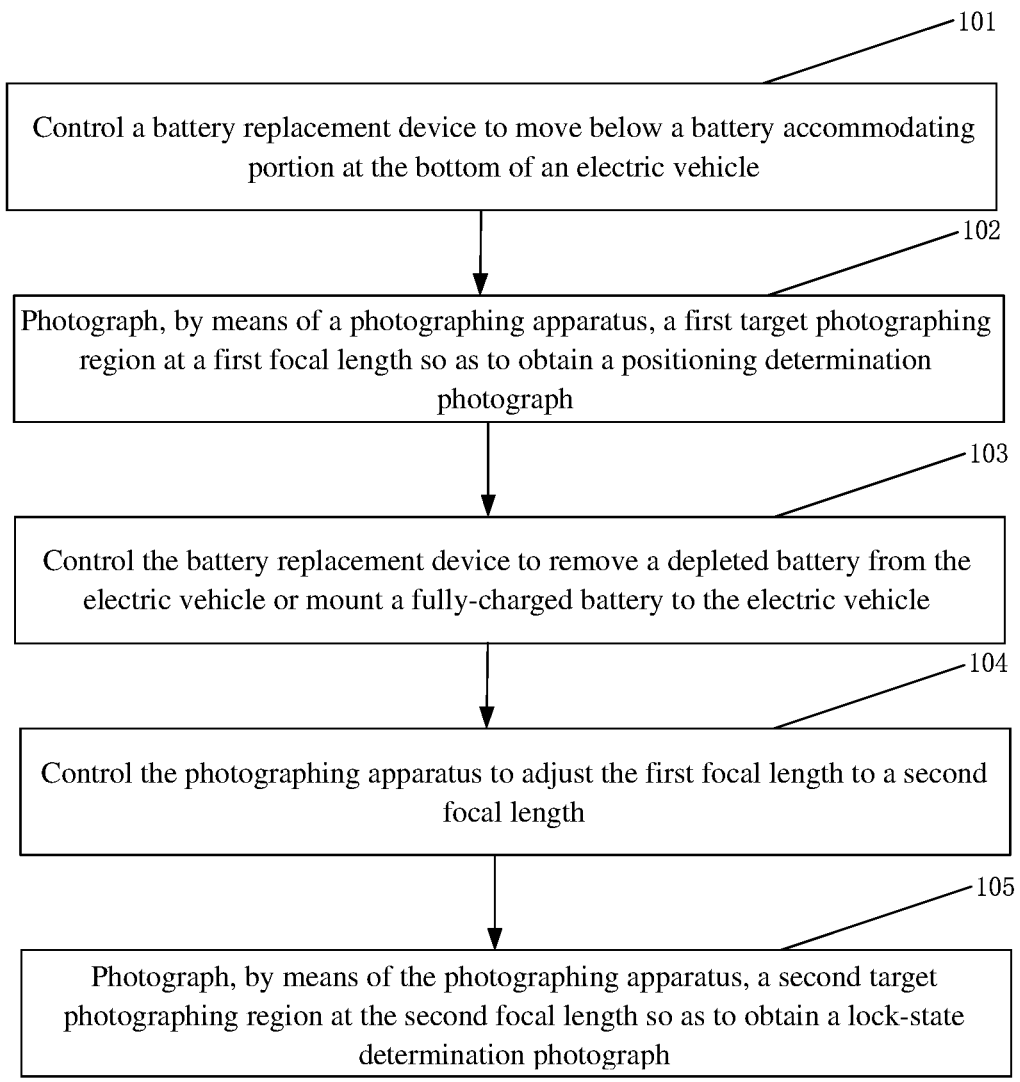
FIG. 1 is a flowchart of a visual positioning method for a battery replacement device according to Embodiment 1 of the present invention.

This embodiment provides a visual positioning method for a battery replacement device. As shown in FIG. 1, the visual positioning method includes the following steps.

Step 101: control the battery replacement device to move below a battery accommodating portion at a bottom of an electric vehicle.

Step 102: photograph, by means of a photographing apparatus, a first target photographing region at a first focal length so as to obtain a positioning determination photograph.

Step 103: control the battery replacement device to remove a depleted battery from the electric vehicle or mount a fully-charged battery to the electric vehicle.

In this step, if the battery replacement device performs the operation of removing the depleted battery, a photographed lock-state determination photograph is used for unlocking determination. Therefore, the lock-state determination photograph at this time may be referred to as an unlocking determination photograph. If the battery replacement device performs the operation of mounting the fully-charged battery, the photographed lock-state determination photograph is used for locking determination. Therefore, the lock-state determination photograph at this time may be referred to as a locking determination photograph.

Step 104: control the photographing apparatus to adjust the first focal length to a second focal length.

Step 105: photograph, by means of the photographing apparatus, a second target photographing region at the second focal length so as to obtain the lock-state determination photograph.

The battery replacement device is provided with the photographing apparatus, and a photographing lens of the photographing apparatus faces directly upward.

The bottom of the electric vehicle includes a battery accommodating portion, the first target photographing region is located at the battery accommodating portion, a lock link is located in the battery accommodating portion, and the second target photographing region is located on the lock link.

Step 103 may realize the process of removing the depleted battery from the electric vehicle or mounting the fully-charged battery thereto in the following manner The battery replacement device includes a movable traveling drive part, a lifting apparatus capable of lifting the battery up and down, and a battery mounting part mounted on the lifting apparatus and used for removing the depleted battery from the electric vehicle or mount the fully-charged battery to the electric vehicle, wherein the battery replacement device further includes an unlocking mechanism and a pallet, and the unlocking mechanism includes an ejector rod arranged on the pallet.

When the battery is removed, the pallet is lifted up by an oil cylinder or air cylinder, and the ejector rod is caused to unlock the depleted battery on the electric vehicle. The depleted battery removed from the vehicle falls on the pallet. After the pallet drops, the battery replacement device transfers the depleted battery to a palletizer, and the palletizer puts the depleted battery into a battery compartment to wait for charging.

When the battery is mounted, the battery replacement device has received a fully-charged battery from the palletizer, and the fully-charged battery is carried inside the pallet. The lifting apparatus lifts the pallet upward, so that lock shafts on both sides of the battery enter openings of the lock base. Then, the pallet is moved horizontally toward the front of the vehicle, so that the lock shafts on both sides of the battery and the lock base are in a locked state, thereby completing the mounting of the battery.

This embodiment controls the photographing apparatus to adjust the focal length for separately photographing the positioning determination photograph and the lock-state determination photograph at the bottom of the vehicle, so as to photograph clearer positioning determination photograph and lock-state determination photograph. The efficient and accurate automatic determination and adjustment of positioning, unlocking, and locking are further implemented by means of photographs photographed at different focal lengths, thereby greatly reducing the battery replacement time.

Embodiment 2

Figure 2:
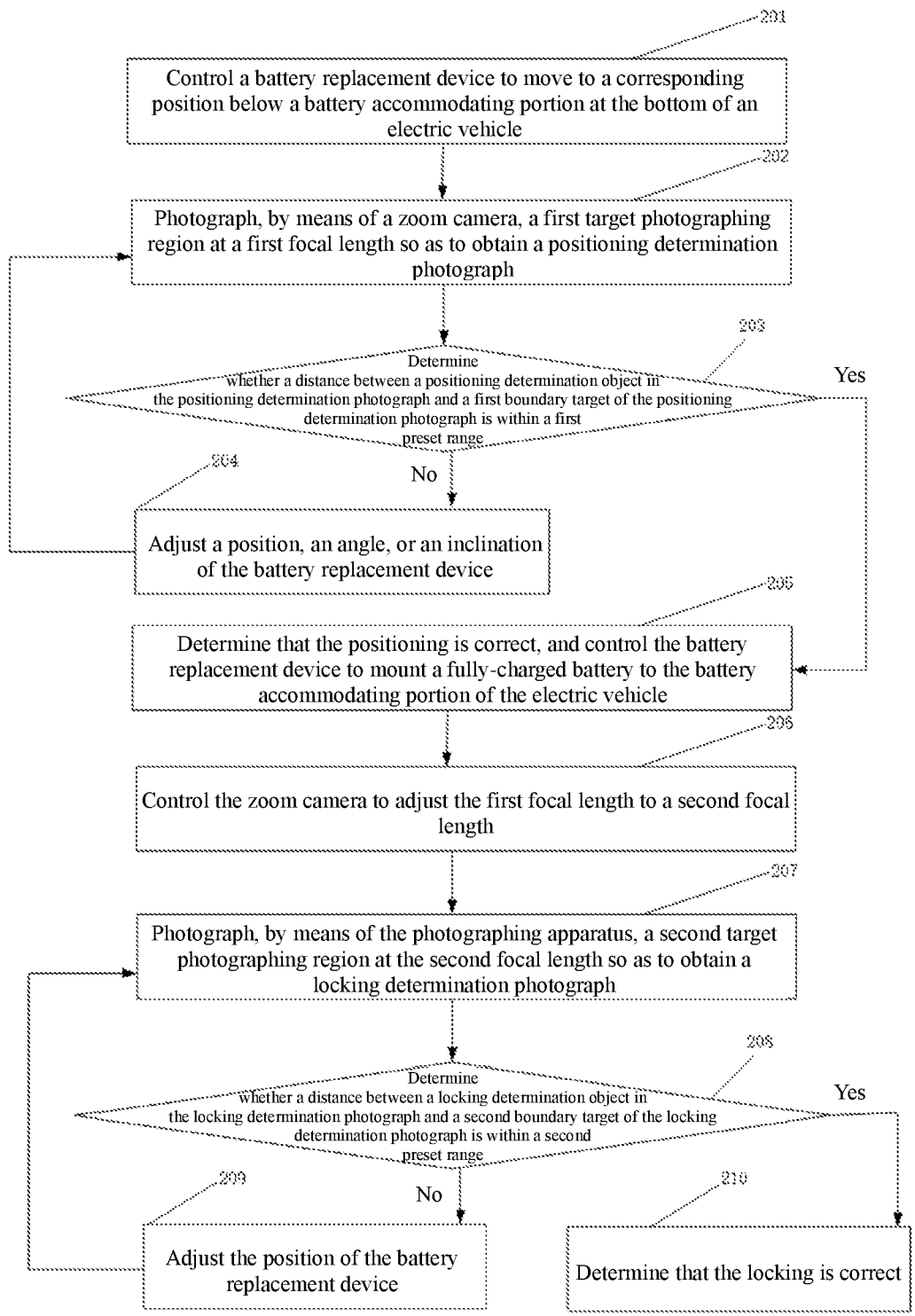
FIG. 2 is a flowchart of a visual positioning method for a battery replacement device according to Embodiment 2 of the present invention.

This embodiment provides a visual positioning method for a battery replacement device. As shown in FIG. 2, the visual positioning method for includes the following steps.

Step 201: control the battery replacement device to move to a corresponding position below a battery accommodating portion at a bottom of an electric vehicle.

Step 202: photograph, by means of a zoom camera, a first target photographing region at a first focal length so as to obtain a positioning determination photograph.

Step 203: determine whether a distance between a positioning determination object in the positioning determination photograph and a first boundary target of the positioning determination photograph is within a first preset range, if so, perform step 205, and if not, perform step 204.

Step 204: adjust a position, an angle, or an inclination of the battery replacement device, and perform step 202.

Step 205: determine that the positioning is correct, and control the battery replacement device to mount a fully-charged battery into the battery accommodating portion of the electric vehicle.

Step 206: control the zoom camera to adjust the first focal length to a second focal length.

Step 207: photograph, by means of the photographing apparatus, a second target photographing region at the second focal length so as to obtain a locking determination photograph.

Step 208: determine whether a distance between a locking determination object in the locking determination photograph and a second boundary target of the locking determination photograph is within a second preset range, if so, perform step 210, and if not, perform step 209.

Step 209: adjust the position of the battery replacement device, and perform step 207.

Step 210: determine that the locking is correct.

In this embodiment, in order to improve the positioning efficiency of the battery replacement device, in step 204, if the number of adjustments exceeds a first preset number of times, it is determined that the positioning fails, and after it is determined that the positioning fails, step 202 may be re-performed to further photograph a positioning determination photograph, and if the first preset number of times is not exceeded, the positioning adjustment is continued.

In this embodiment, in order to improve the locking efficiency of the battery replacement device, in step 209, if the number of adjustments exceeds a second preset number of times, it is determined that the locking fails, and after it is determined that the locking fails, step 207 may be re-performed to further photograph a lock-state determination photograph, and if the second preset number of times is not exceeded, the locking adjustment is continued.

The battery replacement device is provided with the zoom camera, and a photographing lens of the zoom camera faces directly upward.

The bottom of the electric vehicle includes a battery accommodating portion, the first target photographing region is located at the battery accommodating portion, a lock link is located in the battery accommodating portion, and the second target photographing region is located on the lock link.

The focal length range of the first focal length is 330 mm to 380 mm, and the focal length range of the second focal length is 45 mm to 55 mm.

In step 205, the mounting of the fully-charged battery is realized. Before the mounting of the fully-charged battery, it is necessary to remove the depleted battery from the vehicle. The process of removing the depleted battery needs to repeat steps 201 to 210. Only step 205 is the aforementioned operation of unlocking the depleted battery. At this time, an unlocking determination photograph is obtained by photographing in step 206, steps 207 to 210 are determining whether the unlocking is correct, adjusting the position of the battery replacement device when the unlocking fails, and repeating the determination until the unlocking is correct.

In this embodiment, the movement of the entire device in the process of removing the depleted battery and mounting the fully-charged battery may be driven by the traveling drive part in the battery replacement device, so as to achieve the functions of adjusting the battery replacement device in steps 204 and 209. The specific driving method may be any existing method that can realize the movement of the battery replacement device, such as hoisting drive, rack and pinion drive, roller drive, and track drive.

In order to better understand this embodiment, a specific example is given below to describe each step in this embodiment in detail.

First, the zoom camera is arranged on the battery replacement device, with the lens of the zoom camera facing directly upward, so that the zoom camera can photograph the bottom of the electric vehicle without obstruction. Then, step 201 is performed to control the battery replacement device to move below the battery accommodating portion at the bottom of the electric vehicle. Then, step 202 is performed to photograph the battery accommodating portion at the bottom of the electric vehicle at a focal length of 350 mm so as to obtain a positioning determination photograph. If a point A of the battery accommodating portion is set as a reference point, a first reference line passing through the point A and parallel to an x-axis (the x-axis and a y-axis are located in a coordinate system parallel to the bottom surface of the electric vehicle, and the x-axis direction is a horizontal direction of the photographed photograph) is a reference line for positioning determination, when step 203 is performed, a distance between a positioning determination object, that is, the first reference line, in the photographed positioning determination photograph and a first boundary target (in this embodiment, the first boundary target is a boundary parallel to the x-axis of the photograph itself) is 50 mm. However, the distance of a preset range is 40 mm. Therefore, the next step 204 will be performed to adjust the position, angle, or inclination of the battery replacement device. For example, the battery replacement device may be controlled to move in the y-axis direction, and then step 202 is performed to photograph the positioning determination photograph again. In another embodiment, it is also possible not to photograph the positioning photograph again, but to move a distance of 50−40=10 mm in the y-axis direction (an error range may be freely set, such as moving 8 mm or 9 mm), and then directly perform step 205. In this embodiment, adjusting the position of the battery replacement device further includes re-performing the locking or unlocking step, and performing a corresponding determination step after the locking or unlocking step is re-performed.

It should be understood that in this embodiment, the moving direction of the battery replacement device toward the y-axis needs to be set according to the actual situation. For example, if the first boundary target in this embodiment is a lower boundary of the photograph parallel to the x-axis, the battery replacement device needs to be controlled to move in a positive direction along the y-axis. On the contrary, if the first boundary target in this embodiment is an upper boundary of the photograph parallel to the x-axis, the battery replacement device needs to be controlled to move in a negative direction along the y-axis.

It should be understood that this embodiment only enumerates how to adjust the position of the battery replacement device along the y-axis, and for how to adjust the position of the battery replacement device along the x-axis, the positioning determination objects are different and the first boundary targets are different. For example, a reference line passing through the point A and parallel to the y-axis is selected as the positioning determination object, and the first boundary target is the boundary of the photograph itself that is parallel to the y-axis. This will not be repeated here.

Next, step 205 is performed to control the battery replacement device to mount the fully-charged battery received by the palletizer onto the electric vehicle. For a single vehicle, in the locking state, the position of the lock link is unique, and a difference from the position of the link in the unlocking state is at least 3 cm or more. Moreover, different brands and models of electric vehicles will also lead to inaccurate locking positions, which requires further determination. The battery has already been mounted in the electric vehicle at this time, the distance between the battery replacement device and the bottom of the electric vehicle is shorter than the distance when the positioning determination photograph is photographed. Therefore, if the photographing apparatus in the same state is used for photographing, the photograph will be unclear. Therefore, after the battery is mounted, step 206 is performed to adjust the focal length to a short focal length, that is, the zoom camera is controlled to adjust the focal length from 350 mm to 50 mm. Step 207 is then performed, that is, a locking determination photograph is photographed.

Figure 3:
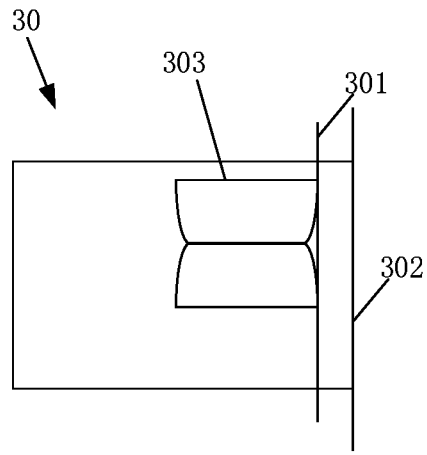
FIG. 3 is a schematic diagram of a locking determination photograph of the battery replacement device according to Embodiment 2 of the present invention.
Figure 4:
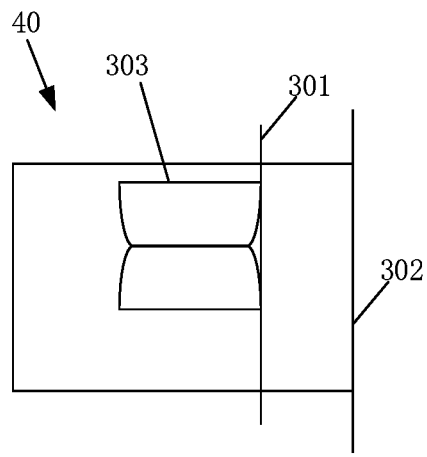
FIG. 4 is a schematic diagram of a locking determination photograph of the battery replacement device according to Embodiment 2 of the present invention.

FIG. 3 and FIG. 4 show schematic diagrams of the locking determination photographs in this embodiment. As shown in FIG. 3, 30 is the locking determination photograph photographed for the first time, 303 is the lock link photographed in the photograph, and 301 represents the locking determination object. In this embodiment, the locking determination object is the boundary line of the lock link, and 302 is the second boundary target, which is the right boundary of the photograph in this embodiment. In this embodiment, a preset locking range is set to be 1 mm to 2 mm, but the distance between the locking determination object 301 and the second boundary target 302 in the locking determination photograph in FIG. 3 is 0.5 mm, which does not meet the preset locking range, and therefore, the battery replacement device is controlled to move in the positive direction of the x-axis, and photographing is performed for the second time. The photograph after photographing is shown in FIGS. 4, and 40 is the locking determination photograph photographed for the second time. At this time, the distance between the locking determination object 301 and the second boundary target 302 is 1.5 mm; therefore, the requirement is met, and it is confirmed that the position of the battery replacement device is correct. It should be understood that in actual situations, the position of the battery replacement device may not necessarily be adjusted by photographing twice only, and this is just an example.

It should be understood that this embodiment only enumerates how to adjust the position of the battery replacement device along the x-axis, and for how to adjust the position of the battery replacement device along the y-axis, the locking determination objects are different and the second boundary targets are different, which are not repeated here.

In this embodiment, the distance between the positioning determination object and the first boundary target is adjusted to a preset positioning range at the first focal length, and the distance between the locking determination object and the second boundary target is adjusted to a preset locking range at the second focal length, which may cause the positioning and locking positions of the battery replacement device more accurate, further reduce the battery replacement time, and improve the battery replacement efficiency. Similarly, the unlocking position of the battery replacement device may be made more accurate, the battery replacement time may be reduced, and the battery replacement efficiency may be improved.

In this embodiment, by setting the photographing apparatus as a zoom camera and setting the focal length ranges of the first focal length and the second focal length, the automatic adjustment of the photographing focal length before and after the positioning and the removing and mounting of the battery is achieved through the zoom camera, which further improves the photographing sharpness of the first target photographing region and second target photographing region.

Embodiment 3

This embodiment is basically the same as Embodiment 2, except that the zoom camera in Embodiment 2 is replaced by a first camera and a second camera, wherein a focal length range of the first camera is 330 mm to 380 mm, and a focal length range of a second focal length is 45 mm to 55 mm.

In this embodiment, automatic adjustment of the focal length can be achieved by setting two zoom cameras and different focal length ranges corresponding to respective zoom cameras and automatically replacing the first camera with the second camera after the battery is mounted or unlocked.

In this embodiment, by setting different focal length ranges of the first focal length and the second focal length, the photographing sharpness of the first target photographing region and second target photographing region is further improved, so that no matter in the positioning determination, the locking determination, or the unlocking determination, clear photographing of the target photographing region can be achieved.

Embodiment 4

Figure 5:
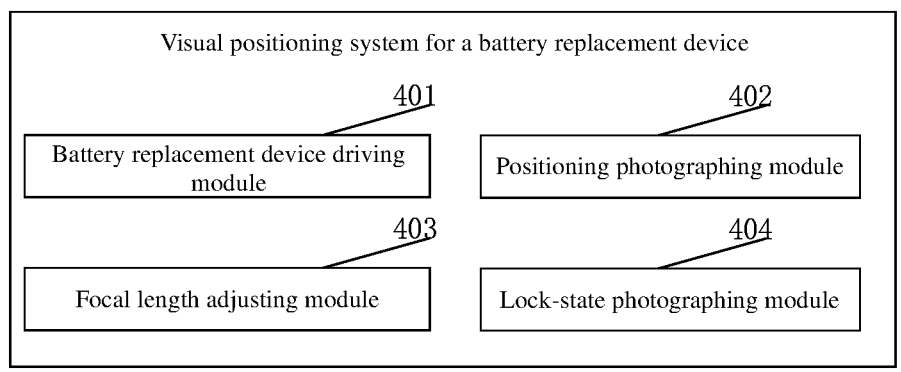
FIG. 5 is a schematic modular diagram of a visual positioning system for a battery replacement device according to Embodiment 4 of the present invention.
Figure 6:
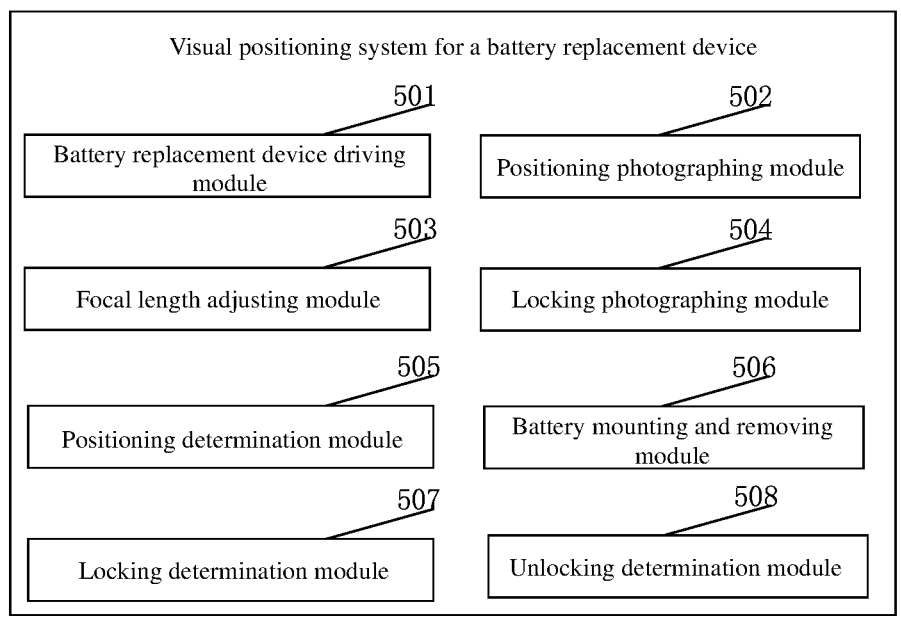
FIG. 6 is a schematic modular diagram of a visual positioning system for a battery replacement device according to Embodiment 5 of the present invention.

This embodiment provides a visual positioning system for a battery replacement device, as shown in FIG. 5. The visual positioning system includes a battery replacement device driving module 401, a positioning photographing module 402, a focal length adjusting module 403, and a lock-state photographing module 404.

The battery replacement device driving module 401 is configured to control the battery replacement device to move below the battery accommodating portion at a bottom of the electric vehicle, and call the positioning photographing module 402.

The positioning photographing module 402 is configured to photograph, by the photographing apparatus, a first target photographing region at a first focal length so as to obtain a positioning determination photograph.

The focal length adjusting module 403 is configured to control the photographing apparatus to adjust the first focal length to a second focal length, and call the lock-state photographing module 404.

The lock-state photographing module 404 is configured to control the photographing apparatus to photograph a second target photographing region at the second focal length so as to form a lock-state determination photograph.

The battery replacement device is provided with the photographing apparatus, and a photographing lens of the photographing apparatus faces directly upward.

The bottom of the electric vehicle includes a battery accommodating portion, the first target photographing region is located at the battery accommodating portion, a lock link is located in the battery accommodating portion, and the second target photographing region is located on the lock link.

The battery replacement device is used for removing a depleted battery from the electric vehicle or mounting a fully-charged battery to the electric vehicle. If the battery replacement device performs the operation of removing the depleted battery, a lock-state determination photograph photographed by the lock-state photographing module 404 is used for unlocking determination. Therefore, the lock-state determination photograph at this time may be referred to as an unlocking determination photograph. If the battery replacement device performs the operation of mounting the fully-charged battery, the lock-state determination photograph photographed by the lock-state photographing module 404 is used for locking determination. Therefore, the lock-state determination photograph at this time may be referred to as a locking determination photograph. The battery replacement device may remove the depleted battery from the electric vehicle and mount the fully-charged battery thereto in the following manner The battery replacement device includes a movable traveling drive part, a lifting apparatus capable of lifting the battery up and down, and a battery mounting part mounted on the lifting apparatus and used for removing the depleted battery from the electric vehicle or mounting the fully-charged battery to the electric vehicle. The battery replacement device further includes an unlocking mechanism and a pallet, and the unlocking mechanism includes an ejector rod arranged on the pallet.

When the battery is removed, the pallet is lifted up by an oil cylinder or air cylinder, and the ejector rod is caused to unlock the depleted battery on the electric vehicle. The depleted battery removed from the vehicle falls on the pallet. After the pallet drops, the battery replacement device transfers the depleted battery to a palletizer, and the palletizer puts the depleted battery into a battery compartment to wait for charging.

When the battery is mounted, the battery replacement device has received a fully-charged battery from the palletizer, and the fully-charged battery is carried inside the pallet. The lifting apparatus lifts the pallet upward, so that lock shafts on both sides of the battery enter openings of the lock base. Then, the pallet is moved horizontally toward the front of the vehicle, so that the lock shafts on both sides of the battery and the lock base are in a locked state, thereby completing the mounting of the battery. This embodiment controls, by the focal length adjusting module, the photographing apparatus to adjust the focal length for separately photographing the positioning determination photograph and the lock-state determination photograph at the bottom of the vehicle, so as to photograph clearer positioning determination photograph and lock-state determination photograph. The efficient and accurate automatic determination and adjustment of positioning, unlocking, and locking are further implemented by means of photographs photographed by the positioning photographing module and the lock-state photographing module at different focal lengths, thereby greatly reducing the battery replacement time.

Embodiment 5

This embodiment provides a visual positioning system for a battery replacement device, including a battery replacement device driving module 501, a positioning photographing module 502, a focal length adjusting module 503, a locking photographing module 504, a positioning determination module 505, a battery mounting and removing module 506, a locking determination module 507, and an unlocking determination module 508.

The battery replacement device driving module 501 is configured to control the battery replacement device to move below a battery accommodating portion at a bottom of an electric vehicle, and call the positioning photographing module 502.

The positioning photographing module 502 is configured to photograph, by means of the photographing apparatus, a first target photographing region at a first focal length so as to obtain a positioning determination photograph.

The positioning determination module 505 is configured to determine whether a distance between a positioning determination object in the positioning determination photograph and a first boundary target of the positioning determination photograph is within a first preset range, if not, determine that the positioning is incorrect, adjust the position of the battery replacement device, and then call the positioning photographing module 502; and if so, call the battery mounting and removing module 506.

The battery mounting and removing module 506 is configured to control the battery replacement device to mount a fully-charged battery into the battery accommodating portion of the electric vehicle, and call the focal length adjusting module 503.

The focal length adjusting module 503 is configured to control the photographing apparatus to adjust the first focal length to a second focal length, and call the locking photographing module 504, and further configured to call the locking determination module 507.

The locking photographing module 504 is configured to control the photographing apparatus to photograph a second target photographing region at the second focal length so as to form a locking determination photograph.

The locking determination module 507 is configured to determine whether a distance between a locking determination object in the locking determination photograph and a second boundary target of the locking determination photograph is within a second preset range, if not, determine that the locking is incorrect, adjust the position of the battery replacement device, and then call the locking photographing module 504; and if so, confirm that the position of the battery replacement device is correct.

In this embodiment, in order to improve the positioning efficiency of the battery replacement device, if the number of adjustments exceeds a first preset number of times, the positioning determination module 505 determines that the positioning fails, and after it is determined that the positioning fails, the positioning photographing module 502 may be re-called to further photograph a positioning determination photograph, and if the first preset number of times is not exceeded, the positioning adjustment is continued.

In this embodiment, in order to improve the locking efficiency of the battery replacement device, if the number of adjustments exceeds a second preset number of times, the locking determination module 507 determines that the locking fails, and it is determined that the locking fails, the locking photographing module 504 may be re-called to further photograph a locking determination photograph, and if the second preset number of times is not exceeded, the locking adjustment is continued.

In this embodiment, the photographing apparatus is a zoom camera.

The battery replacement device is provided with the zoom camera, and a photographing lens of the zoom camera faces directly upward.

The bottom of the electric vehicle includes a battery accommodating portion, the first target photographing region is located at the battery accommodating portion, a lock link is located in the battery accommodating portion, and the second target photographing region is located on the lock link.

The focal length range of the first focal length is 330 mm to 380 mm, and the focal length range of the second focal length is 45 mm to 55 mm.

In order to realize the mounting of the fully-charged battery, the battery mounting and removing module 506 is further configured to remove the depleted battery from the vehicle before mounting the fully-charged battery. The visual positioning system in this embodiment may further include: an unlocking photographing module configured to control the photographing apparatus to photograph the second target photographing region at the second focal length to form an unlocking determination photograph, and call the unlocking determination module 508 configured to determine whether a distance between an unlocking determination object in the unlocking determination photograph and the second boundary target of the unlocking determination photograph is within a third preset range, and if so, confirm that the unlocking is correct, and call the battery mounting and removing module 506 to realize the mounting of a fully-charged battery; and if not, determine that the unlocking is incorrect, adjust the position of the battery replacement device, and continue to call the unlocking photographing module until the unlocking determination module 508 determines that the unlocking is correct.

In this embodiment, the movement of the entire device in the process of removing the depleted battery and mounting the fully-charged battery may be driven by the traveling drive part in the battery replacement device, so as to achieve the functions of adjusting the battery replacement device of the locking determination module 507 and the unlocking determination module 508. The specific driving method may be any existing method that can realize the movement of the battery replacement device, such as hoisting drive, rack and pinion drive, roller drive, and track drive. In order to better understand this embodiment, a specific example is given below to describe each step in this embodiment in detail.

First, the zoom camera is arranged on the battery replacement device, with the lens of the zoom camera facing directly upward, so that the zoom camera can photograph the bottom of the electric vehicle without obstruction. Then, the battery replacement device driving module 501 controls the battery replacement device to move below the battery accommodating portion at the bottom of the electric vehicle. Then, the positioning photographing module 502 is called to photograph the battery accommodating portion at the bottom of the electric vehicle at a focal length of 350 mm so as to obtain a positioning determination photograph. If a point A of the battery accommodating portion is set as a reference point, a first reference line passing through the point A and parallel to an x-axis (the x-axis and a y-axis are located in a coordinate system parallel to the bottom surface of the electric vehicle, and the x-axis direction is a horizontal direction of the photographed photograph) is a reference line for positioning determination, when the focal length adjusting module 503 is called, a distance between a positioning determination object, that is, the first reference line, in the photographed positioning determination photograph and a first boundary target (in this embodiment, the first boundary target is a boundary parallel to the x-axis of the photograph itself) is 50 mm. However, the distance of a preset range is 40 mm. Therefore, the locking photographing module 504 will be called to adjust the position, angle, or inclination of the battery replacement device. For example, the battery replacement device may be controlled to move in the y-axis direction, and then step 202 is performed to photograph the positioning determination photograph again. In another embodiment, it is also possible not to photograph the positioning photograph again, but to move a distance of 50−40=10 mm in the y-axis direction (an error range may be freely set, such as moving 8 mm or 9 mm), and then directly call the positioning determination module 505.

It should be understood that in this embodiment, the moving direction of the battery replacement device toward the y-axis needs to be set according to the actual situation. For example, if the first boundary target in this embodiment is a lower boundary of the photograph parallel to the x-axis, the battery replacement device needs to be controlled to move in a positive direction along the y-axis. On the contrary, if the first boundary target in this embodiment is an upper boundary of the photograph parallel to the x-axis, the battery replacement device needs to be controlled to move in a negative direction along the y-axis.

It should be understood that this embodiment only enumerates how to adjust the position of the battery replacement device along the y-axis, and for how to adjust the position of the battery replacement device along the x-axis, the positioning determination objects are different and the first boundary targets are different. For example, a reference line passing through the point A and parallel to the y-axis is selected as the positioning determination object, and the first boundary target is the boundary of the photograph itself that is parallel to the y-axis. This will not be repeated here.

Next, the battery mounting and removing module 506 removes the depleted battery from the electric vehicle and transfers it to a palletizer, and at the same time mounts a fully-charged battery received from the palletizer onto the electric vehicle. For a single vehicle, in the locking state, the position of the lock link is unique, and a difference from the position of the link in the unlocking state is at least 3 cm or more. Moreover, different brands and models of electric vehicles will also lead to inaccurate locking positions, which requires further determination. The battery has already been mounted in the electric vehicle at this time, the distance between the battery replacement device and the bottom of the electric vehicle is shorter than the distance when the positioning determination photograph is photographed. Therefore, if the photographing apparatus in the same state is used for photographing, the photograph will be unclear. Therefore, after the battery is mounted, the focal length adjusting module 503 is called to adjust the focal length to a short focal length, that is, the zoom camera is controlled to adjust the focal length from 350 mm to 50 mm. The locking determination module 507 is then called, that is, a locking determination photograph is photographed.

FIG. 3 and FIG. 4 show schematic diagrams of the locking determination photographs in this embodiment. As shown in FIG. 3, 30 is the locking determination photograph photographed for the first time, 303 is the lock link photographed in the photograph, and 301 represents the locking determination object. In this embodiment, the locking determination object is the boundary line of the lock link, and 302 is the second boundary target, which is the right boundary of the photograph in this embodiment. In this embodiment, a preset locking range is set to be 1 mm to 2 mm, but the distance between the locking determination object 301 and the second boundary target 302 in the locking determination photograph in FIG. 3 is 0.5 mm, which does not meet the preset locking range, and therefore, the battery replacement device is controlled to move in the positive direction of the x-axis, and photographing is performed for the second time. The photograph after photographing is shown in FIGS. 4, and 40 is the locking determination photograph photographed for the second time. At this time, the distance between the locking determination object 301 and the second boundary target 302 is 1.5 mm, and therefore, the requirement is met, and it is confirmed that the position of the battery replacement device is correct. It should be understood that in actual situations, the position of the battery replacement device may not necessarily be adjusted by photographing twice only, and this is just an example.

It should be understood that this embodiment only enumerates how to adjust the position of the battery replacement device along the x-axis, and for how to adjust the position of the battery replacement device along the y-axis, the locking determination objects are different and the second boundary targets are different, which are not repeated here.

In this embodiment, the positioning determination module adjusts the distance between the positioning reference target and the first boundary target to the preset positioning range at the first focal length, and the locking determination module adjusts the distance between the locking reference target and the second boundary target to the preset locking range at the second focal length, which may cause the positioning and locking positions of the battery replacement device more accurate, further reduce the battery replacement time, and improve the battery replacement efficiency. Similarly, the unlocking position of the battery replacement device may be made more accurate, the battery replacement time may be reduced, and the battery replacement efficiency may be improved. In this embodiment, by setting the photographing apparatus as a zoom camera and setting the focal length ranges of the first focal length and the second focal length, the automatic adjustment of the photographing focal length before and after the positioning and the removing and mounting of the battery is achieved through the zoom camera, which further improves the photographing sharpness of the first target photographing region and second target photographing region.

Embodiment 6

This embodiment is basically the same as Embodiment 5, except that the zoom camera in Embodiment 5 is replaced by a first camera and a second camera, wherein a focal length range of the first camera is 330 mm to 380 mm, and a focal length range of a second focal length is 45 mm to 55 mm.

In this embodiment, automatic adjustment of the focal length can be achieved by setting two zoom cameras and different focal length ranges corresponding to respective zoom cameras and automatically replacing the first camera with the second camera after the battery is mounted or unlocked.

In this embodiment, by setting different focal length ranges of the first focal length and the second focal length, the photographing sharpness of the first target photographing region and second target photographing region is further improved, so that no matter in the positioning determination, the locking determination, or the unlocking determination, clear photographing of the target photographing region can be achieved.

Embodiment 7

This embodiment uses a bolt type battery pack locking mechanism in Chinese invention patent application publication Nos. CN106080159B, CN105946812B, CN106740029A, CN106979192B, CN111845437A, CN210325889U, and the like, and uses an unlocking mechanism in Chinese invention patent application publication Nos. CN206351680U, CN210652647U, and the like, and a battery replacement device in Chinese invention patent application publication Nos. CN205872015U, CN106926825B, and the like.

Differences from Embodiments 1 to 6 lie in that the positioning determination in this embodiment may be a positional relationship between each bolt on the battery and each screw hole on a vehicle body; the lock-state determination may be a height position relationship between the bolt and the screw hole, positions of a steel column and a rising ball, a position relationship with an anti-return/anti-rotation clamping mechanism, and the like.

The position of the battery replacement device is adjusted when it is determined that the unlocking or locking is incorrect and the determination step is re-performed until it is determined that it is correct. In this embodiment, adjusting the position of the battery replacement device further includes re-performing the locking or unlocking step, and performing a corresponding determination step after the locking or unlocking step is re-performed.

Although the specific implementations of the present invention are described above, those skilled in the art should understand that this is only an illustration, and the protection scope of the present invention is defined by the appended claims. Those skilled in the art may make various changes or modifications to these implementations without departing from the principle and essence of the present invention, but these changes and modifications all fall within the protection scope of the present invention.

What is claimed is:

1. A visual positioning method for a battery replacement device, the battery replacement device is used for removing a depleted battery from an electric vehicle and mounting a fully-charged battery thereto, wherein the battery replacement device is provided with a photographing apparatus, a bottom of the electric vehicle comprises a battery accommodating portion, and the visual positioning method comprises:
controlling the battery replacement device to move below the battery accommodating portion at the bottom of the electric vehicle;
photographing, by means of the photographing apparatus, a first target photographing region at a first focal length so as to obtain a positioning determination photograph;
performing a positioning determination step based on the positioning determination photograph: determining whether a distance between a positioning determination object in the positioning determination photograph and a first boundary target of the positioning determination photograph is within a first preset range, and if not, determining that the positioning is incorrect;
controlling the photographing apparatus to adjust the first focal length to a second focal length; and
photographing, by means of the photographing apparatus, a second target photographing region at the second focal length so as to obtain a lock-state determination photograph;
in a process of mounting a fully-charged battery, performing a locking determination step based on the lock-state determination photograph: determining whether a distance between a locking determination object in the lock-state determination photograph and a second boundary target of the lock-state determination photograph is within a second preset range, and if not, determining that the locking is incorrect;
in a process of removing the depleted battery, performing an unlocking determination step based on the lock-state determination photograph: determining whether a distance between an unlocking determination object in the lock-state determination photograph and the second boundary target of the lock-state determination photograph is within a third preset range, and if not, determining that the unlocking is incorrect.

2. The visual positioning method according to claim 1, further comprising:
adjusting a position, an angle, or an inclination of the battery replacement device when it is determined that the positioning is incorrect, and re-performing the positioning determination step until it is determined that the positioning is correct.

3. The visual positioning method according to claim 1, further comprising:
adjusting the position of the battery replacement device when it is determined that the locking is incorrect, and re-performing the locking determination step until it is determined that the locking is correct.

4. The visual positioning method according to claim 1, further comprising:
moving the battery replacement device toward a front of the vehicle or adjusting a position of the battery replacement device when it is determined that the unlocking is incorrect, and re-performing the unlocking determination step until it is determined that the unlocking is correct.

5. The visual positioning method according to claim 3, wherein before the locking determination step or the unlocking determination step is re-performed, the method further comprises: re-performing the locking step or the unlocking step.

6. The visual positioning method according to claim 1, wherein the photographing apparatus is a zoom camera;
in the step of photographing, by means of the photographing apparatus, the first target photographing region at the first focal length so as to obtain the positioning determination photograph, the focal length range of the first focal length is 330 mm to 380 mm; and
in the step of photographing, by means of the photographing apparatus, the second target photographing region at the second focal length so as to obtain the lock-state determination photograph, the focal length range of the second focal length is 45 mm to 55 mm.

7. The visual positioning method according to claim 1, wherein
the photographing apparatus comprises a first camera and a second camera;
the step of photographing, by means of the photographing apparatus, the first target photographing region at the first focal length so as to obtain the positioning determination photograph comprises:
controlling the first camera to photograph the first target photographing region at the first focal length so as to obtain the positioning determination photograph, the focal length range of the first focal length being 330 mm to 380 mm;
the step of controlling the photographing apparatus to adjust the first focal length to the second focal length comprises:
controlling the first camera to stop and starting the second camera; and
the step of photographing, by means of the photographing apparatus, the second target photographing region at the second focal length so as to obtain the lock-state determination photograph comprises:
controlling the second camera to photograph the second target photographing region at the second focal length so as to obtain the lock-state determination photograph, the focal length range of the second focal length being 45 mm to 55 mm.

8. A visual positioning system for a battery replacement device, the battery replacement device being is used for removing a depleted battery from an electric vehicle and mounting a fully-charged battery thereto, wherein the battery replacement device is provided with a photographing apparatus, a bottom of the electric vehicle comprises a battery accommodating portion, and the visual positioning system comprises: a battery replacement device driving module, a positioning photographing module, a focal length adjusting module, and a lock-state photographing module;

the battery replacement device driving module is configured to control the battery replacement device to move below the battery accommodating portion at the bottom of the electric vehicle;

the positioning photographing module is configured to photograph, by means of the photographing apparatus, a first target photographing region at a first focal length so as to obtain a positioning determination photograph;

the focal length adjusting module is configured to control the photographing apparatus to adjust the first focal length to a second focal length; and the lock-state photographing module is configured to photograph, by means of the photographing apparatus, a second target photographing region at the second focal length so as to obtain a lock-state determination photograph-;

the system further comprises a positioning determination module, a locking determination module, and an unlocking determination module;

the positioning determination module is configured to determine whether a distance between a positioning determination object in the positioning determination photograph and a first boundary target of the positioning determination photograph is within a first preset range, and if not, determine that the positioning is incorrect;

the locking determination module is configured to determine whether a distance between a locking determination object in the lock-state determination photograph and a second boundary target of the lock-state determination photograph is within a second preset range, and if not, determine that the locking is incorrect; and the unlocking determination module is configured to determine whether a distance between an unlocking determination object in the lock-state determination photograph and the second boundary target of the lock-state determination photograph is within a third preset range, and if not, determine that the unlocking is incorrect.

9. The visual positioning method according to claim 4, wherein before the locking determination step or the unlocking determination step is re-performed, the method further comprises: re-performing the locking step or the unlocking step.

10. The visual positioning method according to claim 6, wherein the photographing apparatus comprises a first camera and a second camera;

the step of photographing, by means of the photographing apparatus, the first target photographing region at the first focal length so as to obtain the positioning determination photograph comprises:

controlling the first camera to photograph the first target photographing region at the first focal length so as to obtain the positioning determination photograph, the focal length range of the first focal length being 330 mm to 380 mm;

the step of controlling the photographing apparatus to adjust the first focal length to the second focal length comprises:

controlling the first camera to stop and starting the second camera; and the step of photographing, by means of the photographing apparatus, the second target photographing region at the second focal length so as to obtain the lock-state determination photograph comprises:

controlling the second camera to photograph the second target photographing region at the second focal length so as to obtain the lock-state determination photograph, the focal length range of the second focal length being 45 mm to 55 mm.

* * * * *